(12) United States Patent
Chakra et al.

(10) Patent No.: US 9,588,952 B2
(45) Date of Patent: Mar. 7, 2017

(54) COLLABORATIVELY RECONSTITUTING TABLES

(71) Applicant: International Business Machines Corporation, Armonk, NY (US)

(72) Inventors: Al Chakra, Apex, NC (US); Liam Harpur, Skerries (IE); John Rice, Tramore (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/745,663

(22) Filed: Jun. 22, 2015

(65) Prior Publication Data

US 2016/0371244 A1    Dec. 22, 2016

(51) Int. Cl.
   *G06K 9/34*   (2006.01)
   *G06F 17/24*  (2006.01)
   *G06K 9/18*   (2006.01)
   *G06K 9/00*   (2006.01)
   *G06K 9/46*   (2006.01)

(52) U.S. Cl.
   CPC ....... *G06F 17/245* (2013.01); *G06K 9/00442* (2013.01); *G06K 9/18* (2013.01); *G06K 9/46* (2013.01)

(58) Field of Classification Search
   USPC ........ 382/176, 173, 190, 321; 345/440, 522; 117/68, 69, 927; 705/7.27, 14.4, 28; 713/2; 712/1, 222, 225; 715/212, 764
   See application file for complete search history.

(56) References Cited

U.S. PATENT DOCUMENTS

| | | | |
|---|---|---|---|
| 7,523,390 B2 | 4/2009 | Kotler et al. | |
| 7,549,115 B2 | 6/2009 | Kotler et al. | |
| 7,660,973 B2 * | 2/2010 | Hansen | G06F 9/30014 712/222 |
| 7,730,287 B2 * | 6/2010 | Hansen | G06F 9/30014 712/221 |
| 7,818,548 B2 * | 10/2010 | Hansen | G06F 9/30014 712/22 |
| 8,117,426 B2 * | 2/2012 | Hansen | G06F 9/30014 712/221 |
| 8,289,335 B2 * | 10/2012 | Hansen | G06F 9/30018 345/522 |
| 8,769,248 B2 * | 7/2014 | Hansen | G06F 9/30014 712/210 |
| 2009/0228776 A1 | 9/2009 | Folting et al. | |

FOREIGN PATENT DOCUMENTS

| | | | |
|---|---|---|---|
| WO | 2014064527 A1 | 5/2014 | |
| WO | 2014064803 A1 | 5/2014 | |

* cited by examiner

*Primary Examiner* — Anh Do
(74) *Attorney, Agent, or Firm* — Scully, Scott, Murphy & Presser, P.C.; Damion C. Josephs

(57) ABSTRACT

Reconstituting an attribute associated with data. Data in a tabular form may be received. The data is analyzed for a field that is likely to be determined by a formula. Responsive to identifying the field likely to be determined by the formula, An indication of the field and the formula with the data are stored in a repository. The indication of the field and the formula with the data from the repository may be retrieved to facilitate incorporating the data in an application with the formula for the field integrated into the application.

20 Claims, 4 Drawing Sheets

COLLABORATIVELY RECONSTITUTING TABLES

FIELD

The present application relates generally to computers and computer applications, and more particularly to collaboratively reconstituting tables in computer applications.

BACKGROUND

In computer applications such as the spread sheet applications or tools, the formatting or formulas input to the cells of the spreadsheet table may get lost, for example, after a copy and paste operation. As another example, when copying content from one application to another application, the information that may be important for understanding the content may be lost. For instance, the continuous shift of content may lead to loss of value.

BRIEF SUMMARY

A system and method of reconstituting an attribute associated with data may be provided. The system, in one aspect, may comprise a processor operable to receive data in a tabular form. The processor may be further operable to analyze the data for a field that is likely to be determined by a formula. Responsive to identifying the field likely to be determined by the formula, the processor is operable to store an indication of the field and the formula with the data in a storage device coupled to the processor. The processor may be further operable to retrieve the indication of the field and the formula with the data from the storage device to facilitate incorporating the data in an application with the formula for the field integrated into the application.

A method of reconstituting an attribute associated with data, in one aspect, may comprise receiving data in a tabular form. The method may also comprise analyzing the data for a field that is likely to be determined by a formula. The method may further comprise, responsive to identifying the field likely to be determined by the formula, storing an indication of the field and the formula with the data in a repository. The method may also comprise retrieving the indication of the field and the formula with the data from the repository to facilitate incorporating the data in an application with the formula for the field integrated into the application.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one aspect, automatic addition to a spreadsheet table may be implemented so that formulas and/or other information, e.g., hidden information, can automatically be ascertained with a high degree of confidence.

In the process of transferring data between computer applications (e.g., via copy and paste computer-implemented operations or instructions that operate on data stored in memory), information that is not directly or immediately visible such as a formula related to a cell in a spreadsheet table, a note in a presentation file, and others, e.g., that are the back bone of the data may be lost. In one embodiment of the present disclosure, a system and/or method are presented that collaboratively append a tag of value to the content being pasted to another content type.

Figure 1:
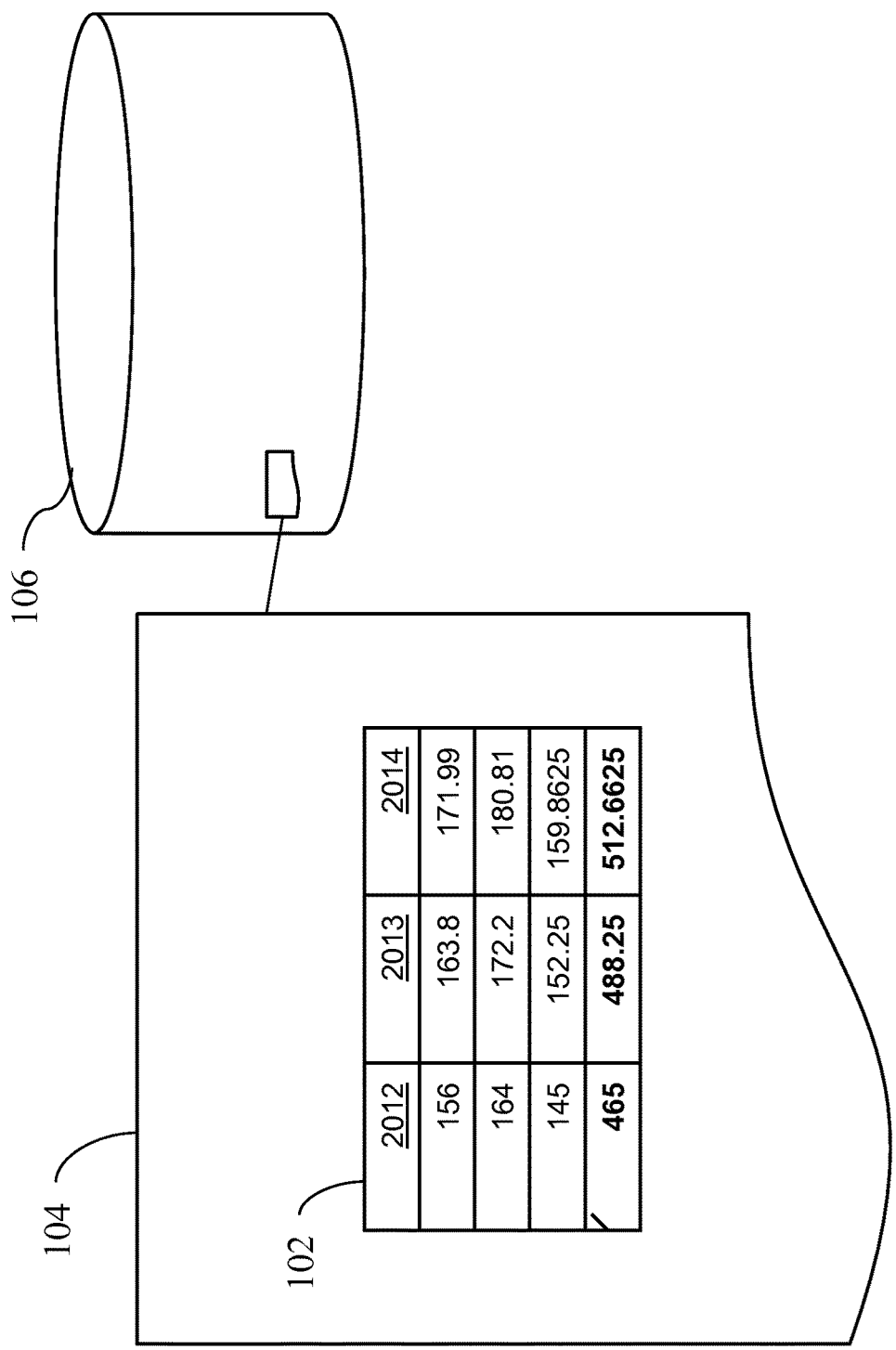
FIG. 1 shows an example data that is copied from one application to another, e.g., a spreadsheet application to a word processing application as a screen captured image.

FIG. 1 shows an example data that is copied from one application to another, e.g., a spreadsheet application to a word processing application as a screen captured image. The table data 102 is copied into a document such as a word processing document 104 and may be stored in a storage device 106, which may be coupled to a hardware processor used in transferring the data from one application file to another application file. The underlying information or attributes about the data, e.g., a formula associated with the numbers shown in the cells of the spreadsheet table is lost during the transfer.

Without such attribute information, it would be difficult to know the relationship between the data. For example, it is not known that the data in the second column labeled '2013' is an increase of 5% from the data in the first column labeled '2012', and the same for the data in the third column labeled 2014 from the data in the second column labeled '2013'. An embodiment of a system and/or method of the present disclosure tags such calculations or attributes to the outgoing content and then pastes this table of data to a different application, and hence maintains the original workings or information associated with the data.

Examples of application files or formats from and to which data may be copied may include but are not limited to a spreadsheet application, word processing application, presentation application, image processing application (e.g., Joint Photographic Experts Group (JPEG) file). In one embodiment, calculations, formulas, notes or other attributes of the data may be embedded as tags, e.g., responsive to the data or content being copied and pasted. In another embodiment, a user may select to embed the tags into the pasted content. As the data or content is pasted to more applications, the system and method of the present disclosure in one embodiment may intelligently amend the calculations.

Figure 2:
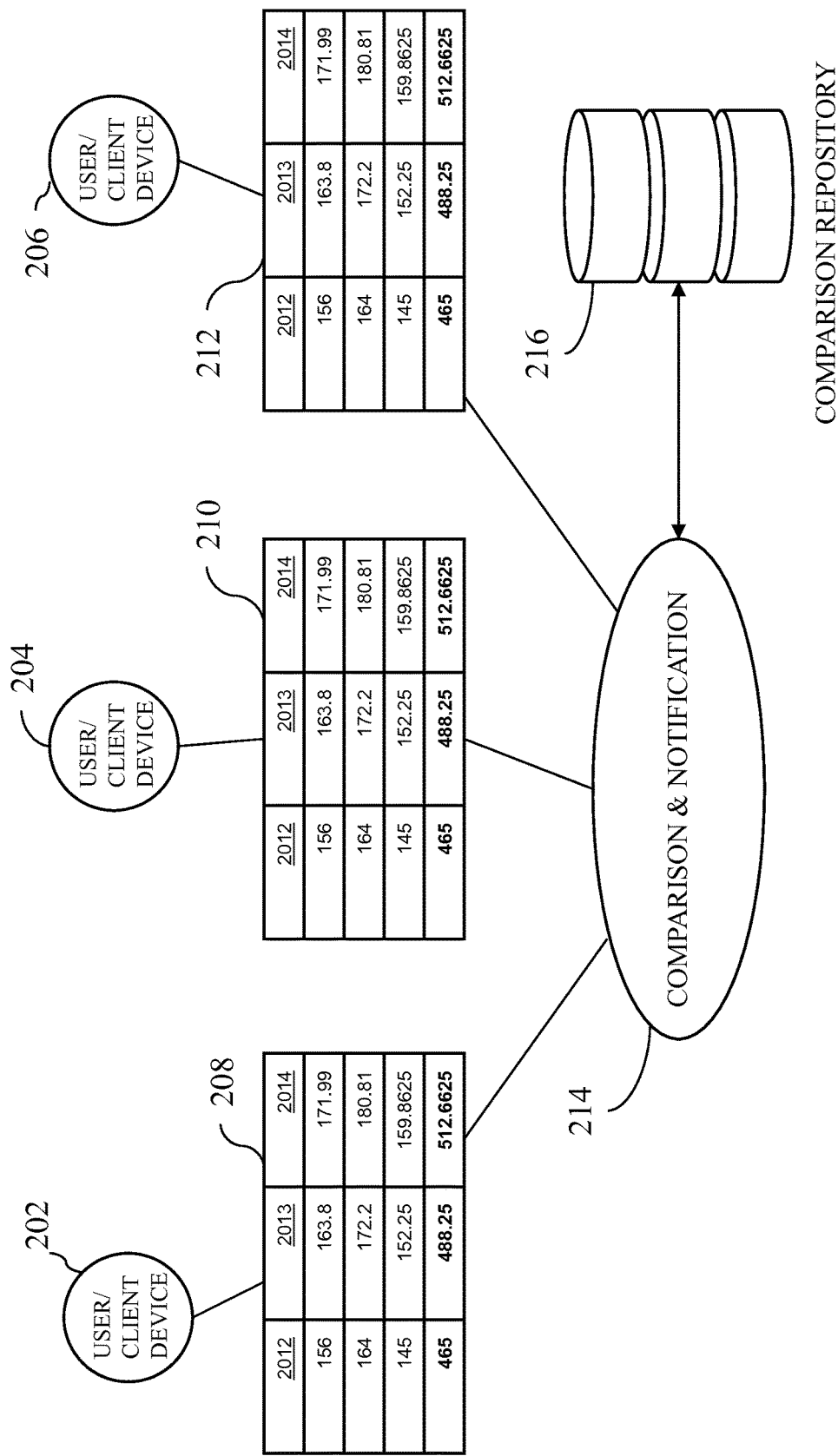
FIG. 2 is a diagram illustrating an example use scenario in one embodiment of the present disclosure.

FIG. 2 is a diagram illustrating an example use scenario in one embodiment of the present disclosure. User A 202 sends User B 204 and User C 206 a screen capture of a table data 208 from a source application file, for example, a spreadsheet application file. The original spreadsheet and formulas are pasted to a mail (electronic mail), for example, as smart text. A recipient server, e.g., a mail server stores the content with the tags. A recipient user is allowed to pull up the calculations since the method and/or system of the present disclosure tags the data with calculations/formulas. In another aspect, the recipient's system or computer may revert the tagged information back into a database. For example, the received image data or pasted unstructured data may be saved in a database as character or text data whose values can be manipulated, along with the formula.

In this example, consider that User B 204 and User C 206 receive the mail (electronic mail) including the screen captured image of the data table. User B 204 and User C 206 may select the screen captured image (e.g., 210, 212 respectively), e.g., by right clicking on the image and selecting to convert the image to a spreadsheet table with its original attributes. An existing technology (e.g., optical character recognition tool) may be leveraged to convert the text data shown in the image into readable characters or text that can be inserted into a spreadsheet.

An analysis engine 214 may ascertain the mathematically likely transformations that have been applied to the data. The analysis engine 214, for example, runs on one or more processors, e.g., a central processing unit (CPU) or another processor. The analysis engine 214 may analyze the converted data to determine the relationships among the data. For instance, the analysis engine may determine that given the available dataset, there is 89% probability that a 5% transformation has been applied from the first column to the second column of the dataset. The analysis engine 214 may employ one or more statistical algorithms such a regression algorithm to determine the relationship between the data.

User B 204 and user C 206 can instantiate a record on the server (e.g., in a repository associated with the server 216) so that the record can be used to collaboratively ascertain the formula over a period of time. Whenever User B 204 and user C 206 encounter another instance of the spreadsheet (in screen capture or native spreadsheet format), then the method and/or system of the present disclosure may update the collaborative record. Collaborative record includes a determined attribute such as formula, determined based on the analysis of the data. Collaborative record may be updated over time, for example, based on additional data (e.g., from the same source). Depending on a policy that may be set, the system may automatically create the collaborative record if the formula is not apparent. The policy may include one or more rules as to how and when the attributes associated with the data may be determined and created.

If any of the trusted or involved users encounter the same spreadsheet data again (in any format, e.g., screen capture or native spreadsheet), then the collaborative record may be updated. For example, if the data that is screen captured from the spreadsheet file is received, that data may be also analyzed to determine the associated attributes such as a formula. For instance, meta data associated with the data may have a token with an option to be enabled to check the ownership of the trusted users that are a part of the collaborative record, for example, similar to a mobile app's connection, to verify if the current user is a previous owner or contributor.

In another aspect, the user may be given the option of applying those transformations to a re-constituted spreadsheet based on the screen capture.

The system and/or method of the present disclosure in one embodiment keeps a track of the "mathematically probable" transformations applied to the spreadsheet data and may embed those transformations (e.g., calculations or notes) as tags. An example is the relationship of number in a screen captured data table, e.g., +15% relationship amongst the columns.

Figure 3:
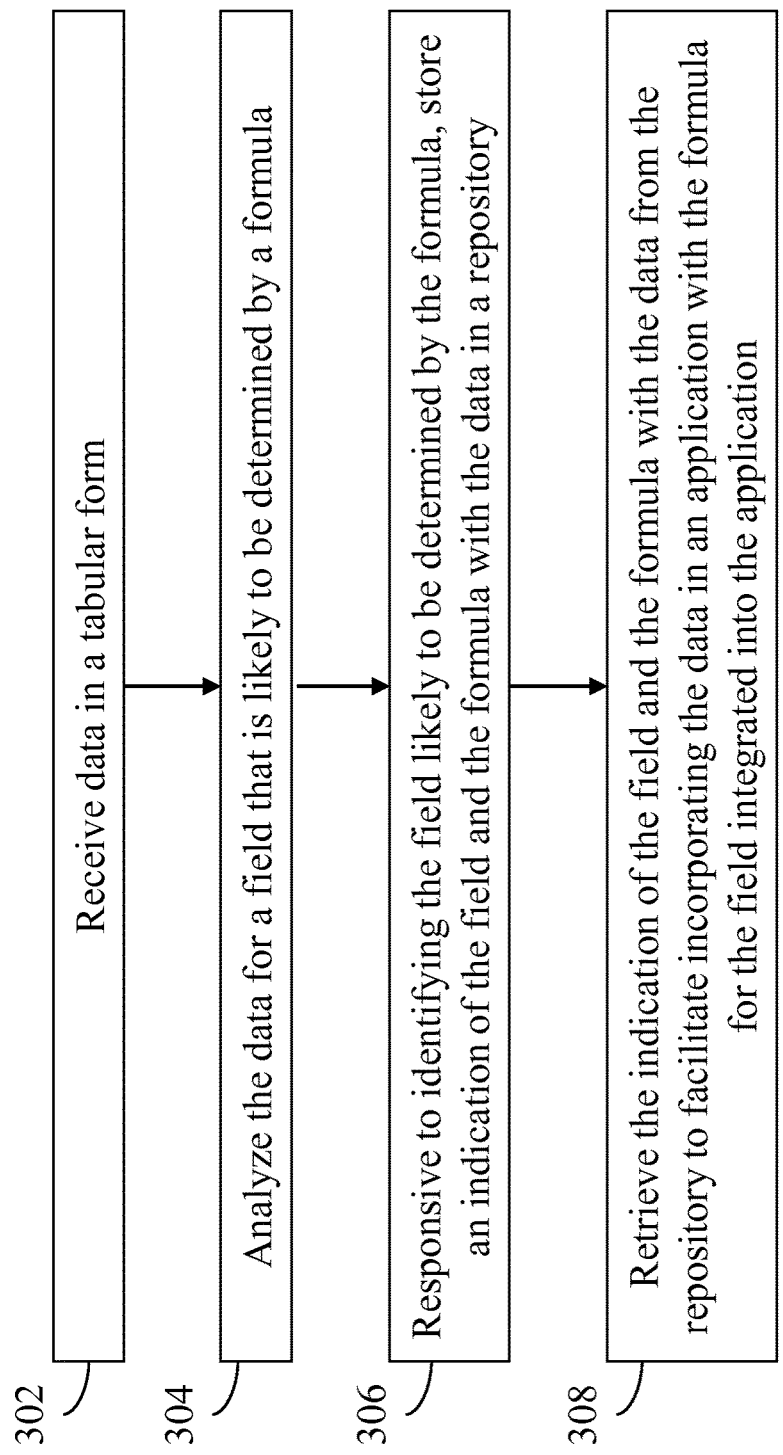
FIG. 3 is a method of reconstituting an attribute associated with data in one embodiment of the present disclosure.

FIG. 3 is a method of reconstituting an attribute associated with data. At 302, data in a tabular form may be received. An example of the data is data in tabular form, and the data in the cells of the table may be related to one another by an attribute, for example, by a mathematical relationship such as a formula. The data, for example, may be part of an image (e.g., a screen capture image, for example, a screen shot of data), pasted unstructured numbers, and/or pasted data from an application such as a spreadsheet application, where the attributes such as formulas would be lost during the paste operation.

At 304, the data is analyzed for a field that is likely to be determined by a formula. One or more statistical techniques or algorithms may be applied to the data to determine the relationship, for example, between the data in one column of the tabular form to another column of the tabular form. If the data is an image, a technique such as optical character recognition (OCR) may be performed to convert or transform the image data into text or character data, for example, to determine values of entries of the data.

An example statistical technique may be a regression algorithm. If, for example, a formula fits the data, for example, according to a statistical technique, it is determined that the field of is likely to be determined by the formula. An example of the formula may be a formula that corresponds to a percentage increase for a period of time.

At 306, responsive to identifying the field likely to be determined by the formula, an indication of the field and the formula are stored with the data in a repository.

At 308, the indication of the field and the formula with the data may be retrieved from the repository to facilitate incorporating the data in an application with the formula for the field integrated into the application.

In one embodiment, data from the same source may be received multiple times. For instance, different parts of the same spreadsheet table may be received, in which case, the initially determined formula may be updated by fitting the additional data together with the previously received data. For instance, the statistical algorithm may be performed on multiple occurrences of receiving the data in the tabular form.

In one aspect, the functionality described above that detects and transforms tabular data to include a tag specifying a likely formula or attribute associated with the data, may be implemented as a component of, or a plug-in to, an application program, such as a word processing program, a spreadsheet program, a presentation program or another program. For instance, responsive to detecting that data (e.g., in unstructured form without attributes, or as an image) is pasted into the application program, such application program may invoke the functionality of the present disclosure, to analyze and generate the attributes (e.g., formula) to the data, and for example, to store the data with the determined likely attribute, for example as tags.

In another aspect, a user may be allowed to select an option to convert the image or unstructured data to include the attributes (e.g., formula). For instance, via a user interface (e.g., a graphical user interface (GUI)) or an editor associated with an application into which the data is pasted, a user may have the option to invoke the functionalities described above. For example, a user may click on the data (or image) portion of the display on the user interface or the editor, which may trigger a pop-up menu (or another user interface element) to display the option that the user can choose.

In one embodiment of the present disclosure, the data that is received as unstructured or as an image data, may be transformed into text or character data with associated attribute, for example, formula. In this way, the unstructured or image data can be transformed back into structured data with associated attribute, which for example, an application program can use or operate on.

Figure 4:
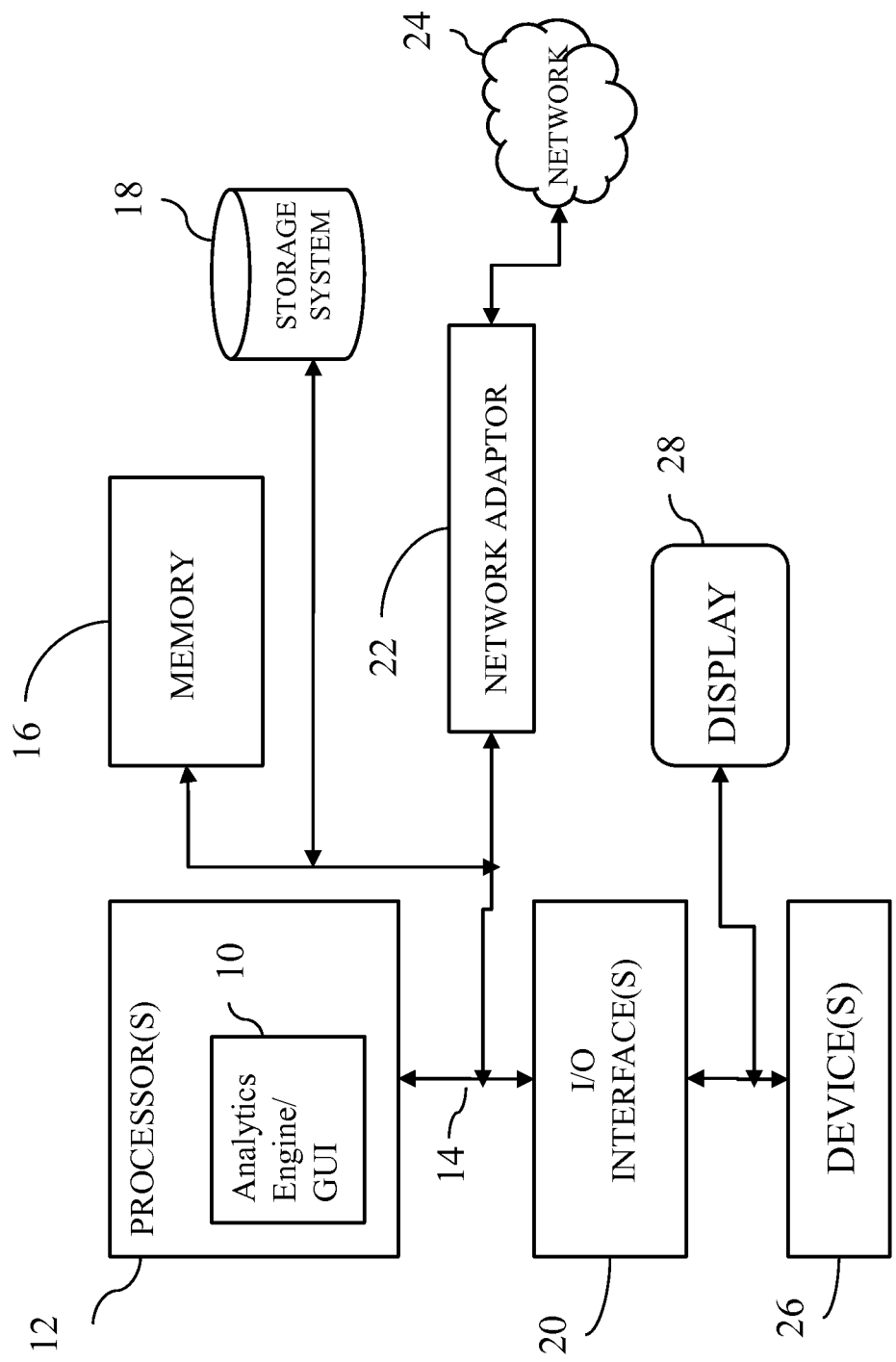
FIG. 4 illustrates a schematic of an example computer or processing system that may implement a system that reconstitutes tables with data attributes or formulas in one embodiment of the present disclosure.

FIG. 4 illustrates a schematic of an example computer or processing system that may implement a system that reconstitutes tables with data attributes or formulas in one embodiment of the present disclosure as described above. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an analytics engine module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of reconstituting an attribute associated with data, comprising:
    receiving, by at least one hardware processor, data in a tabular form;
    analyzing, by the at least one hardware processor, the data for a field that is likely to be determined by a formula;
    responsive to identifying the field likely to be determined by the formula, storing, by the at least one hardware processor, an indication of the field and the formula with the data in a repository; and
    retrieving, by the at least one hardware processor, the indication of the field and the formula with the data from the repository to facilitate incorporating the data in an application with the formula for the field integrated into the application.

2. The method of claim 1, wherein the attribute comprises the formula.

3. The method of claim 1, wherein the data is captured in a screen shot as an image.

4. The method of claim 3, wherein the analyzing the data comprises performing optical character recognition (OCR) to determine values of entries of the data.

5. The method of claim 1, wherein the analyzing further comprises performing a statistical algorithm to the data in the tabular to determine a relationship among the data.

6. The method of claim 5, wherein the statistical algorithm is performed on multiple occurrences of receiving the data in the tabular form.

7. The method of claim 1, wherein the formula corresponds to a percentage increase for a period of time.

8. A computer readable storage medium storing a program of instructions executable by a machine to perform a method of reconstituting an attribute associated with data, the method comprising:
  receiving data in a tabular form;
  analyzing the data for a field that is likely to be determined by a formula;
  responsive to identifying the field likely to be determined by the formula, storing an indication of the field and the formula with the data in a repository; and
  retrieving the indication of the field and the formula with the data from the repository to facilitate incorporating the data in an application with the formula for the field integrated into the application.

9. The computer readable storage medium of claim 8, wherein the attribute comprises the formula.

10. The computer readable storage medium of claim 8, wherein the data is captured in a screen shot as an image.

11. The computer readable storage medium of claim 10, wherein the analyzing the data comprises performing optical character recognition (OCR) to determine values of entries of the data.

12. The computer readable storage medium of claim 8, wherein the analyzing further comprises performing a statistical algorithm to the data in the tabular to determine a relationship among the data.

13. The computer readable storage medium of claim 12, wherein the statistical algorithm is performed on multiple occurrences of receiving the data in the tabular form.

14. The computer readable storage medium of claim 8, wherein the formula corresponds to a percentage increase for a period of time.

15. A system of reconstituting an attribute associated with data, comprising:
  a processor operable to receive data in a tabular form, the processor further operable to analyze the data for a field that is likely to be determined by a formula;
  a storage device coupled to the process,
  wherein responsive to identifying the field likely to be determined by the formula, the processor is operable to store an indication of the field and the formula with the data in the storage device, and
  the processor further operable to retrieve the indication of the field and the formula with the data from the storage device to facilitate incorporating the data in an application with the formula for the field integrated into the application.

16. The system of claim 15, wherein the attribute comprises the formula.

17. The system of claim 15, wherein the data is captured in a screen shot as an image.

18. The system of claim 17, wherein the analyzing the data comprises performing optical character recognition (OCR) to determine values of entries of the data.

19. The system of claim 15, wherein the analyzing further comprises performing a statistical algorithm to the data in the tabular to determine a relationship among the data.

20. The system of claim 19, wherein the statistical algorithm is performed on multiple occurrences of receiving the data in the tabular form.

* * * * *